United States Patent
Lawrence et al.

(10) Patent No.: US 9,719,567 B2
(45) Date of Patent: Aug. 1, 2017

(54) MECHANICAL FRONT WHEEL DRIVE ROLLER WEDGING CONTROL SYSTEM

(71) Applicant: Deere & Company, Moline, IL (US)

(72) Inventors: Jeffrey A. Lawrence, Hartford, WI (US); Erhardt Wowerat, Oakfield, WI (US); Robbie B. Quinn, Cary, NC (US); Brian D. Seegert, Hartford, WI (US); Eric A. Howard, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 47 days.

(21) Appl. No.: 14/518,474

(22) Filed: Oct. 20, 2014

(65) Prior Publication Data

US 2016/0108976 A1    Apr. 21, 2016

(51) Int. Cl.
*F16D 48/06* (2006.01)
*F16D 27/10* (2006.01)
*F16D 41/067* (2006.01)

(52) U.S. Cl.
CPC ............ *F16D 48/06* (2013.01); *F16D 27/10* (2013.01); *F16D 41/067* (2013.01); *F16D 48/064* (2013.01); *F16D 2500/1022* (2013.01); *F16D 2500/10431* (2013.01); *F16D 2500/3118* (2013.01); *F16D 2500/3144* (2013.01); *F16D 2500/31453* (2013.01); *F16D 2500/31493* (2013.01)

(58) Field of Classification Search
CPC ......... F16D 27/00; F16D 27/10; F16D 41/064
See application file for complete search history.

(56) References Cited

U.S. PATENT DOCUMENTS

| | | | |
|---|---|---|---|
| 4,559,846 A | 12/1985 | Cochran et al. | |
| 4,747,462 A | 5/1988 | Herrmann et al. | |
| 5,025,902 A | 6/1991 | Imai et al. | |
| 5,036,939 A | 8/1991 | Johnson et al. | |
| 5,971,123 A | 10/1999 | Ochab et al. | |
| RE38,012 E | 3/2003 | Ochab et al. | |
| 6,622,837 B2 * | 9/2003 | Ochab | B60K 17/3515 192/35 |
| 6,629,590 B2 | 10/2003 | Ochab et al. | |
| 6,659,256 B2 | 12/2003 | Seki et al. | |
| 7,350,632 B2 | 4/2008 | Houtman et al. | |
| 7,938,041 B1 | 5/2011 | Shiigi et al. | |

(Continued)

FOREIGN PATENT DOCUMENTS

| | | |
|---|---|---|
| EP | 0166037 A1 | 5/1984 |
| EP | 1350657 A2 | 10/2003 |

(Continued)

OTHER PUBLICATIONS

Search Report issued in counterpart application No. GB1518577.0, dated Apr. 25, 2016 (3 pages).

*Primary Examiner* — Jacob S Scott
*Assistant Examiner* — Lillian Nguyen

(57) ABSTRACT

A mechanical front wheel drive roller wedging control system includes a 4WD switch in a vehicle operator station, a roller cage drag mechanism electrically activated by the 4WD switch and providing a drag on a roller cage if the 4WD switch is in an on position, and a throttle pedal switch actuated by the throttle pedal and that deactivates the roller cage drag mechanism when the throttle pedal is released.

6 Claims, 2 Drawing Sheets

(56) References Cited

U.S. PATENT DOCUMENTS

| | | | |
|---|---|---|---|
| 8,312,792 | B1 | 11/2012 | Kochidomari et al. |
| 8,840,514 | B1 * | 9/2014 | Knickerbocker ..... B60W 10/12 475/220 |
| 2007/0286743 | A1 * | 12/2007 | Ochab ................... F04B 1/0404 417/313 |
| 2012/0152686 | A1 | 6/2012 | Brewer et al. |
| 2013/0112520 | A1 | 5/2013 | Heath et al. |
| 2013/0199886 | A1 | 8/2013 | Heath et al. |
| 2014/0038763 | A1 | 2/2014 | Knickerbocker et al. |

FOREIGN PATENT DOCUMENTS

| | | | |
|---|---|---|---|
| GB | 2131303 | A | 6/1984 |
| GB | 2142593 | A | 1/1985 |
| GB | 2208217 | A | 3/1989 |
| SU | 1342762 | A1 | 10/1987 |

\* cited by examiner

MECHANICAL FRONT WHEEL DRIVE ROLLER WEDGING CONTROL SYSTEM

FIELD OF THE INVENTION

This invention relates to utility vehicles and other off road machines having a mechanical front wheel drive (MFWD). More specifically, the invention relates to an MFWD control system to prevent wedging of rollers in roller clutches.

BACKGROUND OF THE INVENTION

Utility vehicles and other off road machines may have an MFWD to provide power to the front wheels if the rear wheels slip and lose traction. With the operator controlled 4WD switch in the on position, roller clutches in the front axle gear case will engage and provide drive to the front wheels if rear wheel speed is faster than front wheel speed. With no speed differential between the front and rear wheels, the front drive does not engage and the vehicle is driven by the rear wheels only.

With the 4WD switch in the on position and the transmission in either forward or reverse, voltage may be supplied to a roller cage drag mechanism such as a solenoid. The voltage is stopped when the machine is shifted into neutral. For example, if a solenoid is energized, a plunger may be extended into the path of the rotating tabs of an actuating washer, stopping the outer washer. Wave washers between the inner and outer washers place a drag between the outer (stopped) washer and the inner washer. The inner washer is keyed to a roller brake assembly which is connected to a roller cage by tabs.

The roller cage lies inside a ring gear hub. Each side of the roller cage contains cylindrical rollers that roll around the output hub to each axle. The rollers may be generally cylindrical or may have other geometries.

The drag imposed on the roller cage through the wave washers and tabs forces the rollers slightly off center in the openings of the roller cage. When the rear tires slip and spin more than about 15% faster than the front tires, the rollers move against ramps in the rotating ring gear hub and are forced inward. The inward movement presses the rollers against the left and right output hubs. At this point, all components begin rotating together.

Alternatively, the roller cage drag mechanism may be an electromagnet instead of a solenoid. The 4WD switch may energize an electromagnet that imposes drag on an armature plate, and through direct contact with the plate, to the roller cage.

When the vehicle stops and the operator shifts the transmission from forward to reverse, the voltage to the roller cage drag mechanism is momentarily stopped (neutral switch opened). This allows the springs on each roller to rotate the roller cage and rollers back into a neutral position.

However, certain driving maneuvers may allow the rollers to become wedged tightly between the ramps in the ring gear and output hub, and not move back to the neutral position. For example, in a reverse panic stop, an operator may drive the vehicle in reverse and then apply the brake suddenly to lock the front wheels and tires. High forces tend to push the rollers further up the ramps where they may become wedged against the output hub. Rollers also may become wedged by driving the vehicle up a sloped surface in forward or reverse, then allowing it to roll back down without applying the brakes or shifting the transmission out of forward or reverse.

If a vehicle is driven with wedged rollers, the vehicle drive train may be damaged by high sustained torque transferred through the driveshaft. For example, driveshaft components including the CV joint may be damaged. A mechanical front wheel drive roller wedging control system is needed to prevent wedging of rollers between the ramps in the ring gear and the output hub.

SUMMARY OF INVENTION

A mechanical front wheel drive roller wedging control system includes a roller cage drag mechanism activated by a 4WD switch to drive at least one front wheel if rear wheel slip occurs, and a throttle pedal switch to deactivate the roller cage drag mechanism when the throttle pedal is released. The system prevents wedging of rollers between the ramps in the ring gear and the output hub.

DESCRIPTION OF THE PREFERRED EMBODIMENT

Figure 1:
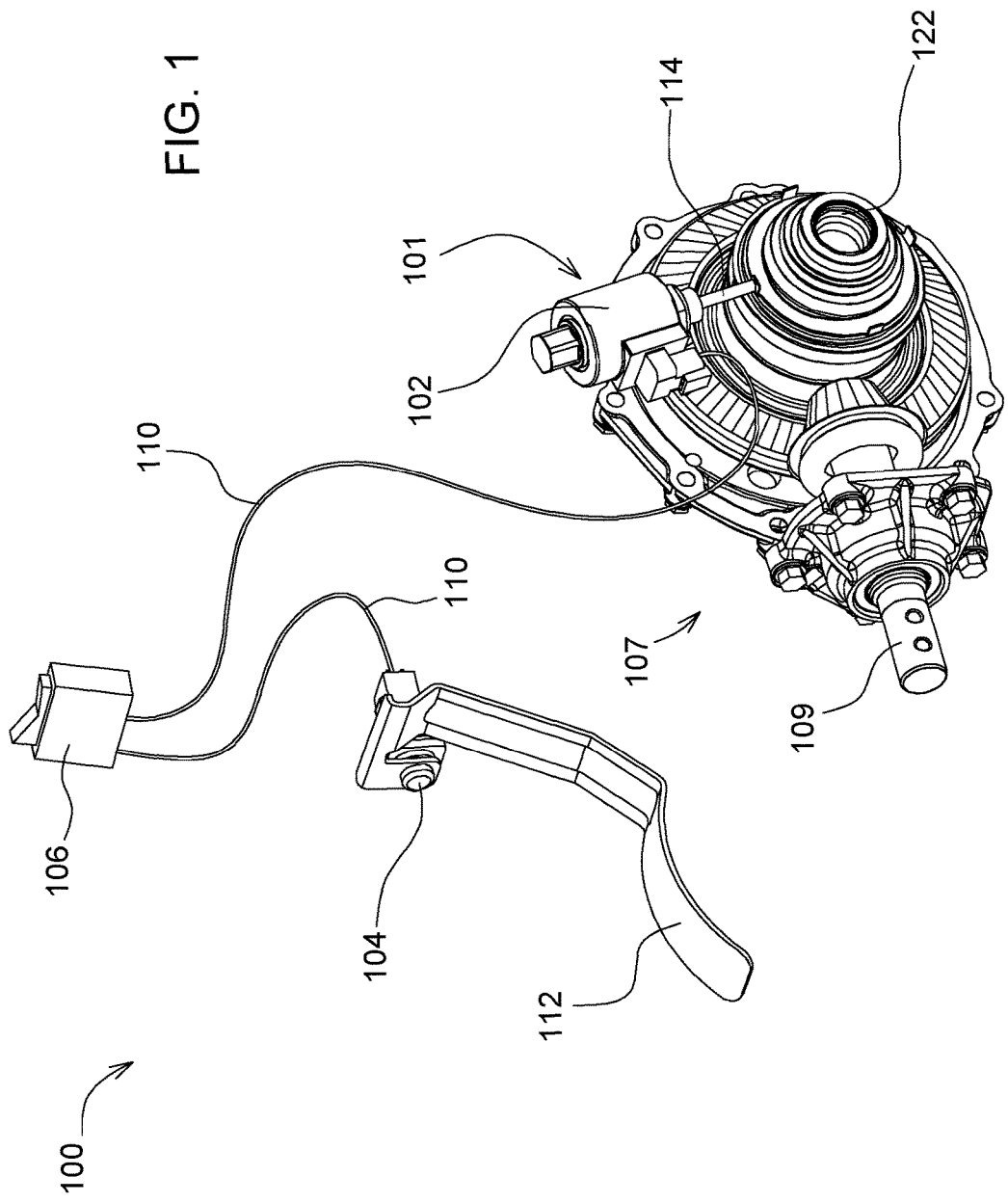
FIG. 1 is a perspective view of a mechanical front wheel drive roller wedging control system, partially in cross section, according to a first embodiment of the invention.
Figure 2:
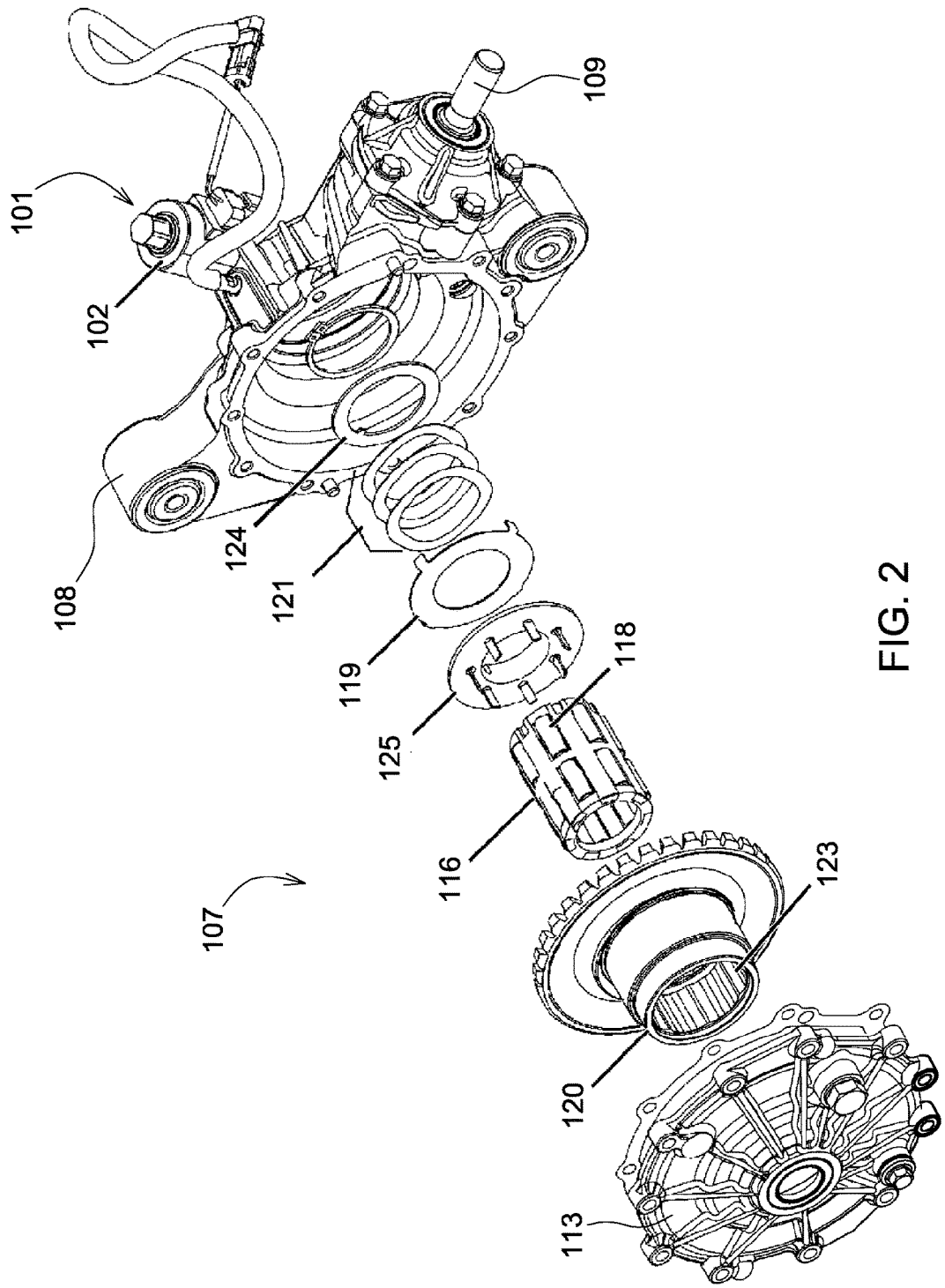
FIG. 2 is an exploded perspective view of a MFWD system with the mechanical front wheel drive roller wedging control system according to a first embodiment of the invention.

In a first embodiment shown in FIGS. 1-2, MFWD roller wedging control system 100 includes roller cage drag mechanism 101, throttle pedal switch 104, and 4WD switch 106. The roller cage drag mechanism may be attached or mounted to the MFWD system 107. Throttle pedal switch 104 may be provided on or adjacent throttle pedal 112. 4WD switch 106 may be located on the dash or operator station of the utility vehicle. Electrical wiring harness 110 may connect the roller cage drag mechanism, throttle pedal switch and 4WD switch in a circuit connected with a power supply on the vehicle. When the 4WD switch is in the on position and the throttle pedal switch is actuated by depressing the throttle pedal, electrical power may be provided through the circuit to activate the roller cage drag mechanism.

In one embodiment, the MFWD system 107 may include a roller cage 116 with a plurality of cylindrical rollers 118, or rollers having other geometries. Each side of the roller cage contains rollers 118 that roll around an output hub 122 to each axle. The roller cage lies inside a ring gear hub 120, which may be mounted inside a housing 108 and enclosed by a cover plate 113. Extension 109 may be connected to the front driveshaft.

In one embodiment, the operator may use 4WD switch 106 to electrically activate roller cage drag mechanism 101. The drag mechanism imposes drag on the roller cage 116 to force the rollers 118 slightly off center in the openings of the roller cage. When the rear tires slip and spin more than about 15% faster than the front tires, the rollers move against ramps 123 in the rotating ring gear hub 120 and are forced inward. The inward movement presses the rollers against the left and right output hubs 122.

In one embodiment, the roller cage drag mechanism may be a solenoid 102. The solenoid may include plunger 114 that may be extended to engage rotating tabs of the outer or actuating washer 119 when the solenoid is powered. When the extended plunger engages the tabs of outer or actuating washer 119, wave washers 121 place a drag between the outer (stopped) washer 119 and the inner washer 124. The inner washer may be keyed to a roller brake assembly 125 which is connected to roller cage 116 by tabs.

In one embodiment, if the operator releases the throttle pedal 112, the throttle pedal switch 104 cuts power to the roller cage drag mechanism. If the roller cage drag mechanism is a solenoid, plunger 114 may be retracted out of engagement with the outer or actuating washer 119. As a result, wave washers 121 stop imposing a drag on the roller cage 116, and the rollers 118 move back to the neutral position before they become wedged between the ramps 123 in ring gear 120 and the output hubs 122. The plunger 114 may remain in the retracted position and the rollers cannot reengage the output hub 122 until the operator depresses the throttle pedal again to actuate the throttle pedal switch while the 4WD switch 106 remains on.

In a second or alternative embodiment, the roller cage drag mechanism may include an electromagnet. When the 4WD switch is in the on position and the throttle pedal switch is actuated by depressing the throttle pedal 112, electrical power may be provided through a circuit to the electromagnet. The electromagnet may impose drag on an armature plate, and through direct contact with the plate, to the roller cage. If the operator releases the throttle pedal 112, the throttle pedal switch 104 cuts power to the electromagnet. The electromagnet releases the armature plate, which stops imposing a drag on the roller cage 116, and the rollers 118 move back to the neutral position before they become wedged between ramps 123 in the ring gear 120 and the output hub 122. The armature plate stays released and the rollers cannot move back up the ramps 123 to engage the output hubs 122 until the operator depresses the throttle pedal again to actuate the throttle pedal switch again while the 4WD switch 106 is on.

The MFWD roller wedging control system may reduce or eliminate the roller wedging problem by employing a throttle pedal switch to cut power to a roller cage drag mechanism such as a solenoid or electromagnet before the rollers become wedged between the ring gear and output hubs. The throttle pedal switch cuts power immediately, and before an operator can apply vehicle brakes and before high forces urge the rollers into a wedged position.

Having described the preferred embodiment, it will become apparent that various modifications can be made without departing from the scope of the invention as defined in the accompanying claims.

The invention claimed is:

1. A mechanical front wheel drive roller wedging control system, comprising:
   a 4WD switch in a vehicle operator station;
   a roller cage drag mechanism electrically activated by the 4WD switch and providing a drag on a roller cage to engage a rotating ring gear hub with a left output hub and a right output hub if the 4WD switch is in an on position; and
   a throttle pedal switch actuated by the throttle pedal and cutting power to the roller cage drag mechanism to disengage the rotating ring gear hub from the left output hub and the right output hub when the throttle pedal is released.

2. The mechanical front wheel drive roller wedging control system of claim 1 wherein the roller cage drag mechanism includes a solenoid with a plunger, the throttle pedal switch cutting power to the solenoid when the throttle pedal is released.

3. A mechanical front wheel drive roller wedging control system, comprising:
   a solenoid having a plunger extending to engage an actuating washer to impose a drag on a roller cage having a plurality of rollers that are engageable between a ring gear hub and an output hub of an MFWD system; and
   a throttle pedal switch cutting power to the solenoid for retracting the plunger when a throttle pedal is released to discontinue imposing a drag on the roller cage before any wedging of the rollers between the ring gear hub and the output hub.

4. The mechanical front wheel drive roller wedging control system of claim 3 wherein the solenoid is electrically actuated by a 4WD switch.

5. A mechanical front wheel drive roller wedging control system, comprising:
   a roller cage drag mechanism between a rotating ring gear hub and a left output hub and a right output hub activated by a 4WD switch to drive at least one front wheel if rear wheel slip occurs;
   a throttle pedal switch cutting power to the roller cage drag mechanism when the throttle pedal is released to disengage the rotating ring gear hub from the left output hub and right output hub.

6. The mechanical front wheel drive roller wedging control system of claim 5 wherein the roller cage drag mechanism is a solenoid with a plunger.

\* \* \* \* \*